(12) United States Patent
Suzuki et al.

(10) Patent No.: US 6,513,321 B2
(45) Date of Patent: Feb. 4, 2003

(54) EXHAUST GAS PURIFYING APPARATUS FOR INTERNAL COMBUSTION ENGINE

(75) Inventors: Norio Suzuki, Saitama (JP); Toru Kitamura, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/733,911

(22) Filed: Dec. 12, 2000

(65) Prior Publication Data
US 2001/0007192 A1 Jul. 12, 2001

(30) Foreign Application Priority Data
Dec. 28, 1999 (JP) .......................... 11-372543
Feb. 22, 2000 (JP) ....................... 2000-044035

(51) Int. Cl.[7] ............................................. F01N 3/00
(52) U.S. Cl. ........................................ 60/285; 60/276
(58) Field of Search ....................... 60/285, 301, 276, 60/299

(56) References Cited

U.S. PATENT DOCUMENTS

| 5,090,199 | A | * | 2/1992 | Ikuta et al. | 60/277 |
|---|---|---|---|---|---|
| 5,337,557 | A | * | 8/1994 | Toyoda | 60/285 |
| 5,339,627 | A | * | 8/1994 | Baier | 60/276 |
| 5,472,580 | A | * | 12/1995 | Kennard, III et al. | 60/277 |
| 5,609,025 | A | * | 3/1997 | Abe | 60/285 |
| 5,619,852 | A | * | 4/1997 | Uchikawa | 60/285 |
| 5,640,846 | A | * | 6/1997 | Ohuchi et al. | 60/285 |
| 5,755,094 | A | * | 5/1998 | Maki et al. | 60/276 |
| 5,758,491 | A | * | 6/1998 | Agustin et al. | 60/277 |
| 5,848,527 | A | * | 12/1998 | Mitsutani | 60/274 |
| 5,867,982 | A | * | 2/1999 | Tengblad et al. | 60/285 |
| 6,018,945 | A | * | 2/2000 | Nakagawa | 60/285 |
| 6,044,643 | A | * | 4/2000 | Ittner et al. | 60/285 |
| 6,145,304 | A | * | 11/2000 | Takahashi et al. | 60/285 |
| 6,253,541 | B1 | * | 7/2001 | Sullivan et al. | 60/285 |
| 6,256,981 | B1 | * | 7/2001 | Sullivan et al. | 60/274 |

FOREIGN PATENT DOCUMENTS

JP        8-319822        12/1996

* cited by examiner

Primary Examiner—Thomas Denion
Assistant Examiner—Diem Tran
(74) Attorney, Agent, or Firm—Arent Fox Kintner Plotkin & Kahn, PLLC

(57) ABSTRACT

In an exhaust gas purifying apparatus of the present invention, oxygen sensors 18 and 20 are respectively located upstream, a close coupled three-way catalyst 14 positioned at the upstream end of an exhaust system, and downstream, in a under floor three-way catalyst 17 positioned at the downstream end. When an output VO2 of the oxygen sensor 20 exceeds a predetermined voltage VO2H2, the first correction coefficient KCMDLS is calculated in accordance with the output VO2 (S12 and S13). And when VO2≦VO2H2 is established, in accordance with the engine operating state the second correction coefficient KVMDR is set to a predetermined value KVMDR0 that is slightly greater than 1.0 (S16 to S18), and the target air-fuel ratio coefficient KCMD is corrected by using the correction coefficients KCMDLS and KCMDR (S21).

4 Claims, 5 Drawing Sheets

EXHAUST GAS PURIFYING APPARATUS FOR INTERNAL COMBUSTION ENGINE

BACKGROUND OF THE INVENTION

1. Field of the Invention

The present invention relates to an exhaust gas purifying apparatus, for which a plurality of exhaust gas purifying catalysts are provided, for purifying the exhaust gases from internal combustion engine, and relates in particular to an exhaust gas purifying apparatus that can reduce the density of the unburnt elements contained in the exhaust to several tens of ppm or lower.

2. Description of the Related Art

It is well known that unwanted elements in exhaust are reduced by providing, for an exhaust system, a plurality of three-way catalysts that perform the oxidation-reduction of elements (HC, CO and NOx) discharged by an internal internal combustion engine, and that when oxygen sensors are provided upstream and downstream of these three-way catalysts, the output of the upstream oxygen concentration sensor is employed to carry out main feedback control for adjusting the air-fuel ratio, and that the output of the downstream oxygen concentration sensor is employed to carry out sub-feedback control for correcting the main feedback control.

In a three-way catalyst, since the unburnt elements (HC and CO) in the exhaust react with water ($H_2O$) and a water-gas reaction occurs whereby hydrogen ($H_2$) and carbon dioxide ($CO_2$) are generated, the hydrogen density tends to be increased downstream of the three-way catalyst that is positioned nearest the downstream end of the exhaust system. Then, when the hydrogen density is increased around the periphery of the oxygen concentration sensor, the sensor output is shifted to a density level that is lower than the actual oxygen density, and as a result, the precision provided by the sub-feedback control is deteriorated.

To resolve this problem, in Japanese Patent Unexamined Publication No. Hei. 8-319822(JP-A-8-319822), a technique is employed whereby the amount of cerium oxide ($CeO_2$), which has an oxygen storage capacity, that each three-way catalyst holds is changed in accordance with the location of the three-way catalyst. That is, the amount of cerium oxide held by a downstream three-way catalyst is smaller than the amount of cerium oxide that is held by an upstream three-way catalyst, so that the water-gas reaction is suppressed and the increase in the hydrogen density downstream of the three-way catalyst is reduced.

However, when the accuracy of the air-fuel ratio control is improved and the exhaust gas purifying function is enhanced as well by increasing the number of three-way catalysts (when the final densities of the HC and CO elements are reduced to several tens of ppm or less), even if the air-fuel ratio is shifted slightly to rich side(on fuel), the densities of the HC and CO elements (oxidize-possible elements, called unburnt elements, generally) in the exhaust are extremely low, as the density of the oxygen is also low at downstream of the three-way catalyst nearest the end of the exhaust system. As a result, there is an insufficient change in the output of the oxygen concentration sensor, and the conventional sub-feedback control can not be carried out. That is, since a so-called binary oxygen concentration sensor, whose output voltage varies widely for the stoichiometric air-fuel ratio, is so designed that its output voltage changes because unburnt elements in the exhaust are oxidized and deposited on the surfaces of platinum electrodes. Therefore, a satisfactory change in the output voltage can not be obtained when the density of the unburnt elements is extremely reduced, and sub-feedback control can be difficult to carry out. In this case, when the water-gas reaction is suppressed using the method shown in JP-A-8-31982, this problem can be partially resolved, but satisfactory effects can not be obtained.

Further, another well known method is one whereby an oxygen concentration sensor is not placed downstream of the downstream end of a three-way catalyst, but in the midst of a plurality of three-way catalysts (for example, when three catalysts are installed on, upstream side of the three-way catalyst nearest the end of the exhaust system). According to this method, however, since the state of the exhaust finally discharged can not be confirmed, the exhaust characteristic may be degraded due to the deterioration of the catalyst located downstream of the oxygen concentration sensor.

And when a binary oxygen concentration sensor is employed, since it will not be able to detect when oxygen saturation of the catalyst in the oxygen storage capacity occurs nor when an excessive amount of oxygen is present downstream of the catalyst, the amount of NOx in the exhaust may be increased.

SUMMARY OF THE INVENTION

To resolve this problem, it is one objective of the present invention to provide an exhaust gas purifying apparatus that can implement a low emission characteristic in accordance with which the final density of the unburnt elements is reduced to several tens of ppm or less, and that can appropriately correct a control of an air-fuel ratio based on the output of a sensor that is located downstream of the catalyst in an exhaust system, so that not only an increase in the unburnt elements but also an increase in the amount of NOx in the exhaust can be suppressed.

To achieve the above objective, according to a first aspect of the invention, an exhaust gas purifying apparatus comprises:

a plurality of catalyst purifying means that are positioned in an exhaust system of an internal combustion engine so as to purifying exhaust gas;

upstream side detection means provided upstream of catalyst means located in the upstream end of the exhaust system, for detecting the density of a specific element in the exhaust;

downstream side detection means provided downstream of catalyst means located in the downstream end of the exhaust system, for detecting the density of a specific element in the exhaust;

target air-fuel ratio setting means, for setting a target air-fuel ratio for a gas mixture that is supplied to the internal internal combustion engine;

feedback control means, for carrying out feedback control using the output of the upstream side detection means to match the air-fuel ratio of the gas mixture with the target air-fuel ratio;

first target air-fuel ratio correction means, only when the output of the downstream side detection means exceeds a predetermined value, which corrects the target air-fuel ratio set by the target air-fuel ratio setting means in accordance with the out put of the downstream side detecting means; and second target air-fuel ratio correction means whcih corrects the target air-fuel ratio to a smaller value than a stoichiometric air-fuel ratio, at least until the output of the downstream side detection means exceeds the predetermined value.

With this arrangement, feedback control is carried out by using the output of the upstream side detection means to correct the air-fuel ratio of the gas mixture so that it matches the target air-fuel ratio. And when the output of the downstream side detection means exceeds the predetermined value, the target air-fuel ratio is corrected in accordance with the output of the downstream side detection means, and further, at least until the output of the downstream side detection means exceeds the predetermined value, the target air-fuel ratio is corrected to obtain a smaller value than the stoichiometric air-fuel ratio. When the output of the downstream side detection means exceeds the predetermined value, it means that the hydrogen density at downstream of catalyst means disposed on the downstream side is high due to the water-gas reaction of the catalyst means. Therefore, only in this case, the target air-fuel ratio is corrected in accordance with the output of the downstream side detection means. As a result, correction of the target air-fuel ratio can be performed in accordance with a slight increase in the unburnt elements, and the density of the unburnt elements in the final exhaust can always be held low. In addition, at least until the output of the downstream side detection means exceeds the predetermined value, the target air-fuel ratio is set to a smaller value than the stoichiometric air-fuel ratio, so that a phenomenon can be prevented whereby there is an excessive increase in the oxygen contained in the exhaust and the NOx in the exhaust is increased. As a result, a preferable exhaust characteristic can be maintained.

The plurality of catalyst purifying means have a purifying function which reduce the density of the unburnt elements downstream of catalyst means disposed on the downstream side to several tens of ppm or lower. It is preferable that the downstream side detection means be an oxygen concentration sensor having a characteristic which varies the output thereof drastically in the vicinity of the stoichiometric air-fuel ratio.

It is also preferable that the second target air-fuel ratio correction means correct the target air-fuel ratio when the internal internal combustion engine is running under conditions of the oxygen storage capacity of the catalyst means frequently tending to become saturated.

DETAILED DESCRIPTION OF THE PREFERED EMBODIMENT

The preferred embodiment of the present invention will now be described while referring to the accompanying drawings.

Figure 1:
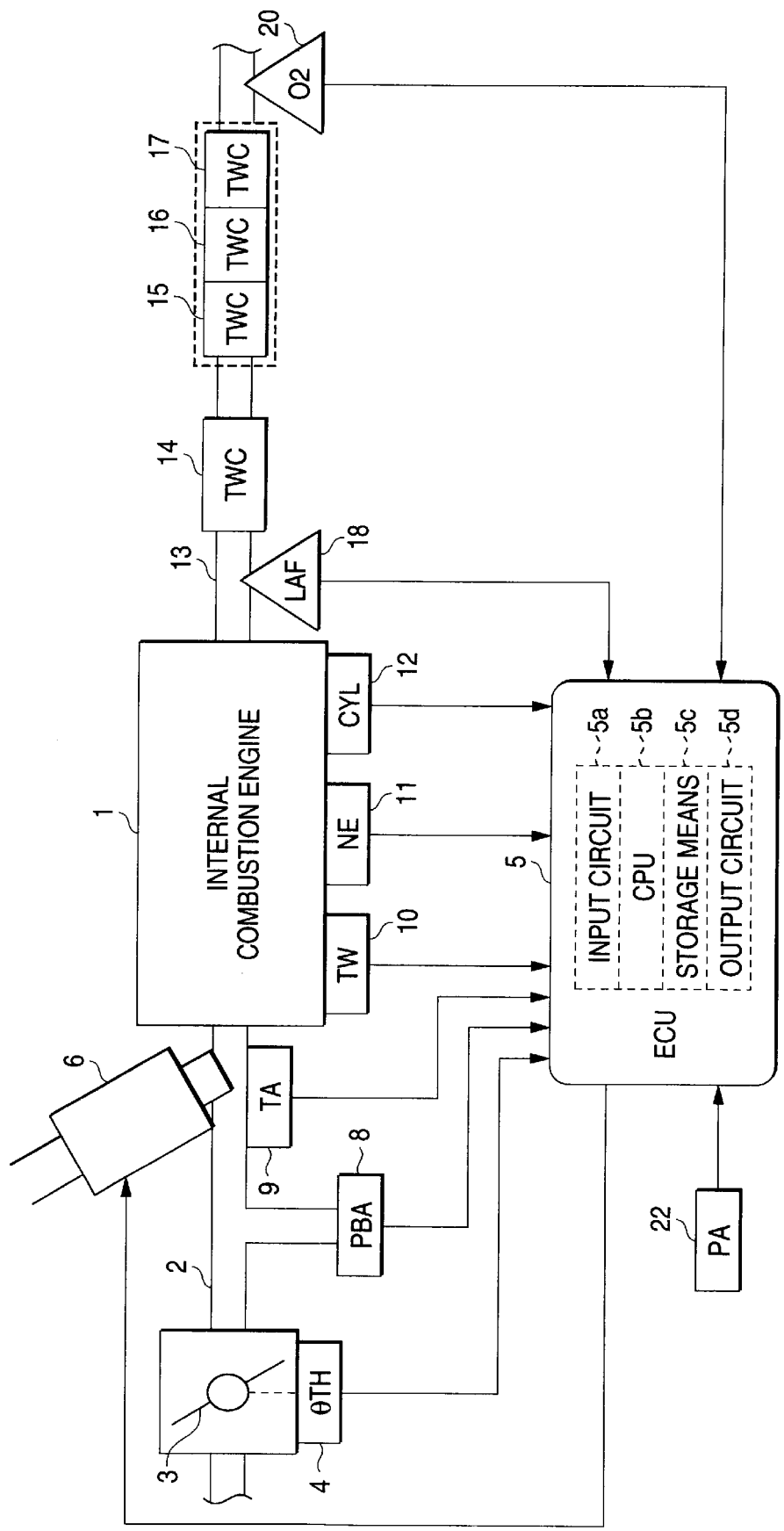
FIG. 1 is a diagram showing the configuration of an internal combustion engine and an exhaust gas purifying apparatus according to one embodiment of the present invention.

FIG. 1 is a diagram showing the general configuration of an internal combustion engine (hereinafter referred to as an engine) and an exhaust gas purifying apparatus according to the embodiment of the present invention. A throttle valve 3 is located along an intake pipe 2 of an engine 1 of, for example, four cylinders. A throttle valve opening ($\theta$TH) sensor 4 is connected to the throttle valve 3. In accordance with the opening of the throttle valve 3, the throttle valve opening sensor 4 outputs an electric signal to an electronic control unit (hereinafter referred to as an ECU) 5 for controlling the engine 1.

For each cylinder, a fuel injection value 6 is located between the engine 1 and the throttle valve 3, and slightly upstream of an intake valve (not shown) in the intake pipe 2. Each fuel injection valve 6 is connected to a fuel pump (not shown) and is electrically connected to the ECU 5, so that the times for opening the fuel injection valves 6 are controlled in response to signals from the ECU 5.

An intake pipe absolute pressure (PBA) sensor 8 is located immediately downstream of the throttle value 3. An absolute pressure signal is converted into an electric signal by the absolute pressure sensor 8, and the electric signal is transmitted to the ECU 5. An intake air temperature (TA) sensor 9, which is provided downstream of the PBA sensor 8, detects an intake air temperature TA and outputs a corresponding electric signal to the ECU 5.

An engine coolant temperature (TW) sensor 10, which is connected to the main body of the engine 1, consist of a thermistor, or the like. The TW sensor 10 detects the engine coolant temperature (cooling water temperature) TW, and outputs a corresponding electric signal to the ECU 5.

An engine revolution count (NE) sensor 11 and a cylinder identification (CYL) sensor 12 are provided around the camshaft or the crankshaft (neither shown) of the engine 1. The engine speed sensor 11 outputs a TDC signal pulse at the crank angle position (at each 180° angle of the four-cylinder engine) at a predetermined crank angle before top dead center (TDC) when the intake stroke of each cylinder of the engine 1 begins. And the cylinder identification sensor 12 outputs a cylinder identification signal pulse at a predetermined crank angle position for a specific cylinder. These signal pulses are transmitted to the ECU 5.

A close coupled three-way catalyst 14 and first to third under floor catalysts 15, 16 and 17 are provided along an exhaust pipe 13. the close coupled three-way catalyst 14 is located immediately downstream of the exhaust manifold of the engine 1, and the first to the third under floor three-way catalysts 15 to 17 are located downstream and slightly separated from the close coupled three-way catalyst 14.

The close coupled three-way catalyst 14 has a volume of, for example, 1.0 litter, and ceria ($CeO_2$, cerium oxide) having the oxygen storage capacity is added at a ratio of 700 g/cft (gram/cubic feet). Since 1 cft≈28.317 litter, 700 g/cft ≈25 g/litter. The first and the second under floor three-way catalysts 15 and 16 have a volume of, for example, 0.7 litter, and while ceria is not added to the first under floor three-way catalyst 15, ceria is added to the second three-way catalyst 16 at a ratio of 1500 g/cft. Since ceria is added, the NOx can be reduced and removed due to the water-gas reaction for which ceria is used as a catalyst, the NOx purifying window (range) is expanded, and the NOx purifying ratio can be increased, even at a lean air-fuel ratio.

Upstream of the close coupled three-way catalyst 14, a proportional air-fuel ratio sensor (hereinafter referred to as an LAF sensor) 18 is positioned as the upstream side detection means. The LAF sensor 18 outputs, to the ECU 5, an electric signal that is substantially proportional to the oxygen density (air-fuel ratio) in the exhaust.

Downstream of the third under floor three-way catalyst 17, a binary oxygen concentration sensor (hereinafter referred to as an O2 sensor) 20 is positioned as the downstream side detection means, and outputs a detection signal to the ECU 5. According to a characteristic of the O2 sensor 20, the output is drastically changed when the air-fuel ratio is around the same as the stoichiometric air-fuel ratio. The output of the O2 sensor 20 is high on the rich side of the stoichiometric air-fuel ratio, and is low on the lean side.

An atmosphere pressure sensor 22 is provided for detecting an atmosphere pressure PA, and outputs a detection signal to the ECU 5.

The ECU 5 comprises: an input circuit 5a, for shaping an input signal waveform received from each of these sensors, correcting the voltage level to a predetermined level, and converting an analog signal value into a digital signal value; a central processing unit (hereinafter referred to as a CPU) 5b; storage means 5c, for storing various calculation programs, executed by the CPU 5b, and calculation results; and an output circuit 5d, for transmitting a drive signal to the fuel injection valves 6.

The CPU 5b identifies various engine operating states based on the several engine parameter signals described above. Further, in accordance with the engine operating state that is identified, the CPU 5b employs equation (1) to calculate a fuel injection time TOUT for the fuel injection valve 6 that is driven in synchronization with the TDC signal pulse:

$$TOUT = TiM \times KCMD \times KLAF \times K1 + K2 \qquad (1).$$

In this equation, TiM defines a basic fuel amount, specifically, the basic fuel injection time for the fuel injection valve 6, and is determined by searching a Ti map that is set in accordance with the engine revolution Ne and the intake pipe absolute pressure PBA. The Ti map is so designed that in an operating state corresponding to the engine revolutions Ne and the intake pipe absolute pressure PBA, the gas mixture supplied to the engine is substantially the same as the stoichiometric air-fuel ratio.

KCMD denotes a target air-fuel ratio coefficient, and is set in accordance with the engine operating parameters, such as the engine revolution count NE, the throttle valve opening θTH and the engine coolant temperature TW. The target air-fuel ratio coefficient KCMD is proportional to the reciprocal of the air-fuel ratio A/F, i.e., the fuel-air ratio F/A. Since the KCMD is equal to a value of 1.0 at the stoichiometric air-fuel ratio, it is also called a target equivalence ratio.

As will be described later, when an output VO2 of the O2 sensor 20 is higher than a predetermined voltage VO2H2, the target air-fuel ratio coefficient KCMD is corrected by using a first correction coefficient KCMDLS that is set in accordance with the output VO2. And when the output VO2 of the O2 sensor 20 is lower than the predetermined voltage VO2H2, the target air-fuel ratio coefficient KCMD is corrected to a value slightly greater than 1.0 by using a second correction coefficient KCMDR. This occurs because variances in the characteristics of the engine exhaust system, the LAF sensor and the three-way catalyst and effects that are arisen as time elapses are suppressed, especially when the oxygen density at the downstream side of the exhaust pipe is appropriately controlled, to maintain a preferable exhaust characteristic.

KLAF is an air-fuel ratio correction coefficient that is calculated by the PID control. When the execution condition of the feedback control is established, KLAF is employed so that the equivalence ratio KACT, obtained from the detection value of the LAF sensor, matches the target equivalence ratio KCMD.

K1 and K2 are a correction coefficient and a correction variable that are calculated in accordance with the engine parameter signals. K1 and K2 are set to predetermined values to optimize various characteristics, such as the fuel consumption characteristic and the engine acceleration characteristic, in accordance with the engine operating state.

Based on the thus obtained fuel injection time TOUT, the CPU 5b outputs, via the output circuit 5d, a drive signal to the fuel injection valve 6 to open the fuel injection valve 6.

Figure 2:
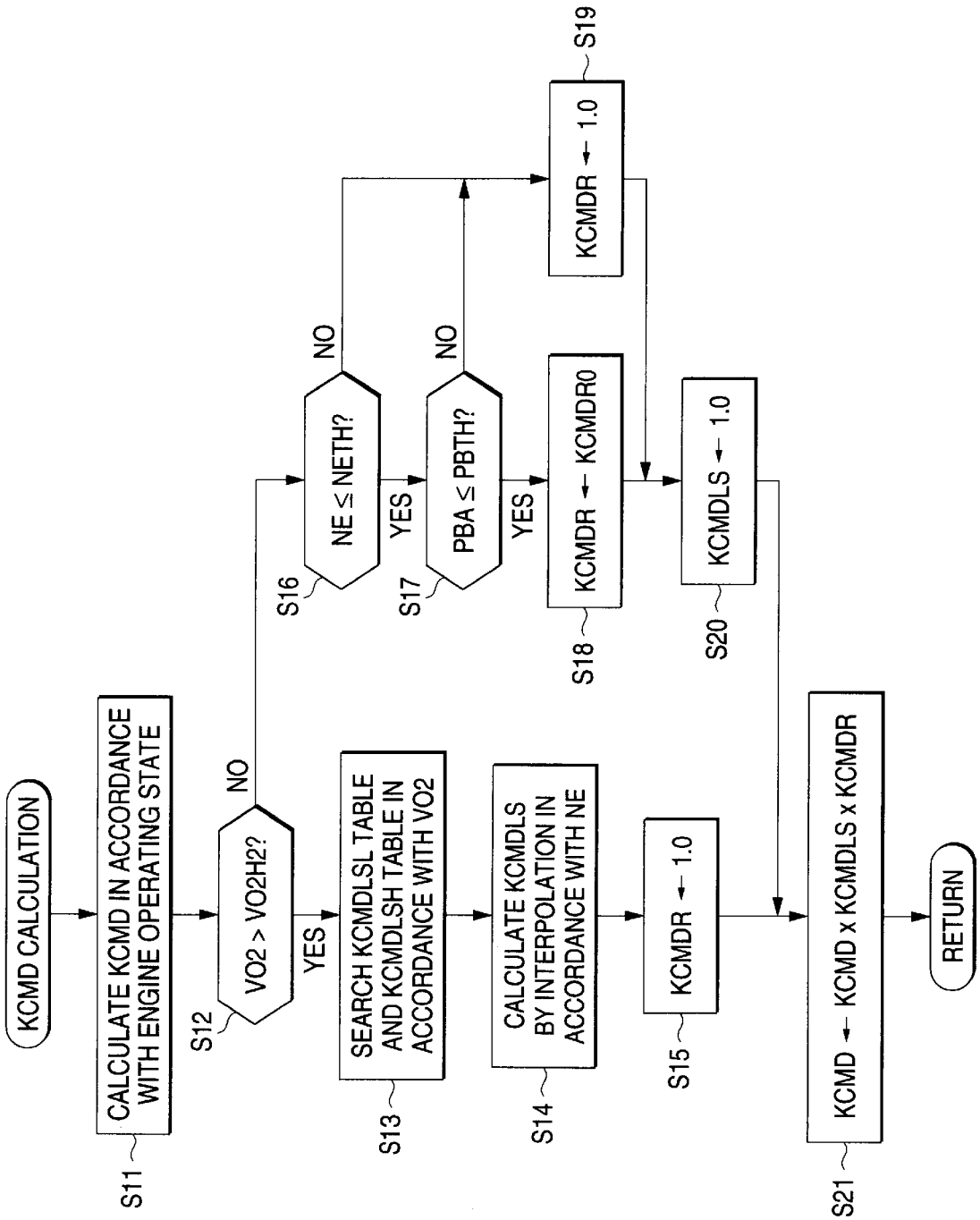
FIG. 2 is a flowchart showing the processing performed to calculate a target air-fuel ratio coefficient (KCMD)

FIG. 2 is a flowchart showing the processing performed to calculate the target air-fuel ratio coefficient KCMD used for equation (1). This processing is performed by the CPU 5b in synchronization with the generation of the TDC signal pulse.

At step S11 the target air-fuel ratio coefficient KCMD is calculated in accordance with the engine operating state. The target air-fuel ratio coefficient KCMD is basically set in accordance with the engine revolution count NE and the absolute, intake pipe pressure PBA. In a high-load operating state or at a low engine coolant temperature TW, the target air-fuel ratio coefficient KCMD is corrected in accordance with the engine load and the engine coolant temperature TW.

At steps S12 to S20, the correction coefficients KCMDLS and KCMDR of the target air-fuel ratio coefficient KCMD are calculated in accordance with the output VO2 of the O2 sensor and the engine operating state.

When the close coupled three-way catalyst 14 and the first to third under floor three-way catalysts 15 to 17, located along the exhaust pipe 13, are functioning normally, and when the air-fuel ratio is shifted to rich side from the stoichiometric air-fuel ratio, the hydrogen ($H_2$) density tends to be increased due to a water-gas reaction. The water-gas reaction is a reaction where CO and water ($H_2O$) react with each other, as in reaction formula (2), to generate $H_2$ and $CO_2$ (hereinafter referred to as a hydrogen generation reaction). Actually, the hydrogen generation reaction and a reaction that is performed in the reverse direction (hereafter referred to as a reverse reaction), i.e., a reaction where $H_2$ and $CO_2$ react with each other to generate CO and $H_2O$, are in a state of equilibrium, and depending on the temperature, the ratio of the hydrogen generation reaction and the reverse reaction is changed. At 500°, for example, the rate of the hydrogen generation reaction is higher, and the hydrogen density is about four times the CO density.

$$CO + H_2O \leftrightarrow CO_2 + H_2 \qquad (2)$$

Figure 3:
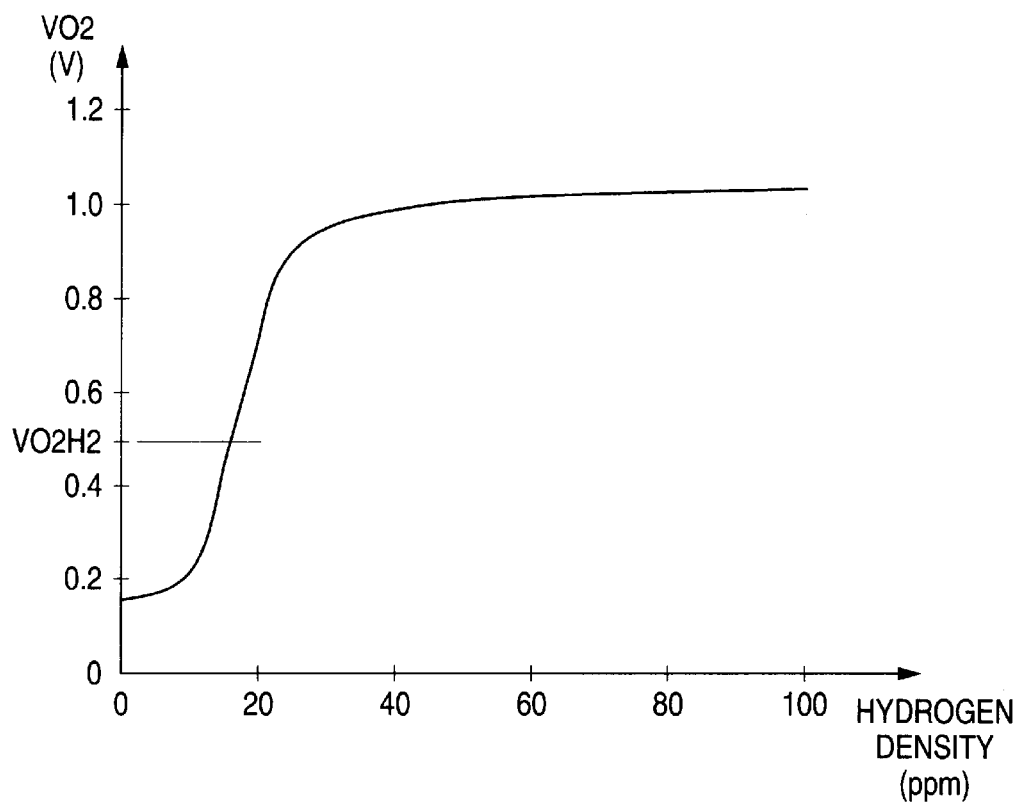
FIG. 3 is a diagram showing the relationship between hydrogen output and a sensor output (VO2)

It has been confirmed through experimentation that, relative to an increase in the hydrogen density, the O2 sensor 20 has the output characteristic shown in FIG. 3. In this embodiment, therefore, when the output VO2 of the O2 sensor 20 exceeds a predetermined voltage VO2H2, the first correction coefficient KCMDLS is calculated in accordance with the sensor output VO2, and the target air-fuel ratio coefficient KCMD is corrected by using the corrected first correction coefficient KCMDLS.

In this manner, based on the O2 sensor output VO2, the lack of oxygen (shift of the air-fuel ratio to rich) downstream of the downstream side of the under floor three-way catalyst 17 can be detected from the increase in the hydrogen density. However, if there is an excessive increase in oxygen, the binary O2 sensor 20 can not detect this state. In this embodiment, therefore, to prevent an excessive oxygen state, when the output VO2 indicates that the hydrogen density is low, the second correction coefficient KCMDR is set to a value slightly greater than 1.0, and oxygen accumulated in the three-way catalyst is gradually reduced. As a result, an increase in the exhaust NOx due to an excessive oxygen state can be avoided, and a preferable exhaust characteristic can be maintained.

Specifically, a check is performed to determine whether the O2 sensor output VO2 is higher than a predetermined voltage VO2H2 (e.g., 0.5 V) (step S12). When VO2≦VO2H2, a check is performed to determine whether the engine revolution count NE is equal to or smaller than a predetermined revolution count NETH (3000 rpm) (step S16). And when NE≦NETH, a check is performed to determine whether the intake pipe absolute pressure PBA is equal to or lower than a predetermined pressure PBTH (e.g., 61.3 kPa (460 mmHg)) (step S17).

When NE>NETH or PBA>PBTH, the second correction coefficient KCMDR of the target air-fuel ratio coefficient KCMD is set to 1.0 (no correction value) (step S19), and the first correction coefficient KCMDLS of the target air-fuel ratio coefficient KCMD is set to 1.0 (no correction value) (step S20). Program control then advances to step S21. And when NE≦NETH and PBA≦PBTH, and the engine 1 is in a low-load operating state, the second correction coefficient KCMDR is set to a predetermined rich value KCMDR0 (e.g., 1.002) (step S18). Program control thereafter advances to step S20.

Figure 4:
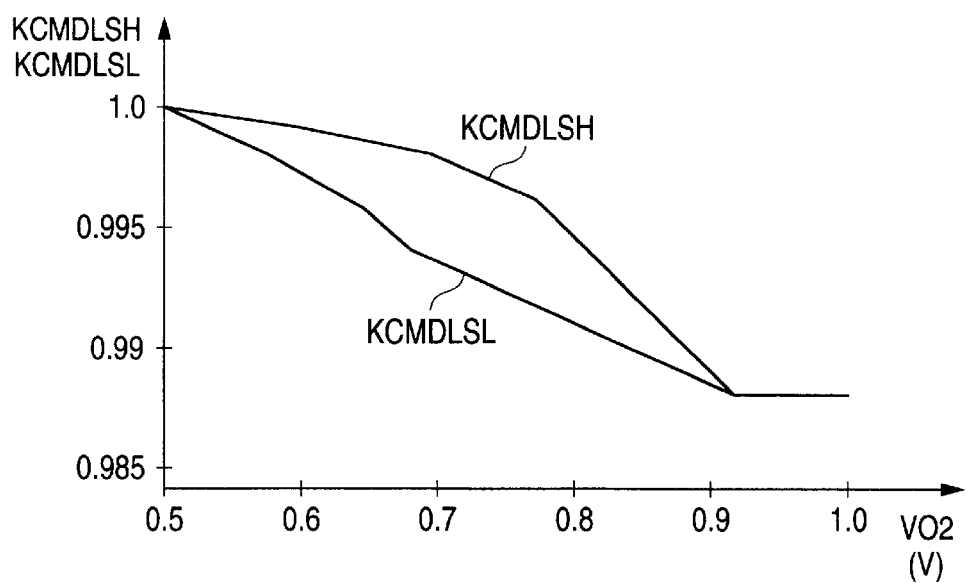
FIG. 4 is a diagram showing a table used for the processing in FIG. 2.

When at step S12 VO2>VO2H2, the KCMDLSH table and the KCMDLSL table in FIG. 4 are examined in accordance with the O2 sensor output VO2 to obtain a high revolution correction coefficient KCMDLSH and a low revolution correction coefficient KCMDLSL. The high revolution correction coefficient KCMDLSH is applied when the engine revolution count NE is equal to or greater than a predetermined high revolution count NEH (e.g., 2500 rpm), and the low revolution correction coefficient KCMDLSL is applied when the engine revolution count NE is equal to or lower than a predetermined low revolution count NEL (e.g., 1500 rpm) (step S13). In the KCMDLSH table and the KCMDLSL table, as the O2 sensor output VO2 rises, i.e., as the hydrogen density is increased, the correction coefficients KCMDLSH and KCMDLSL are reduced, and KCMDLSH≧KCMDLSL.

At step S14, when the engine revolution count NE is equal to or lower than the predetermined low revolution count NEL, KCMDLS=KCMDLSL is established. When the engine revolution count NE is equal to or higher than the predetermined high revolution count NEH, KCMDLS= KCMDLSH is established. And when the engine revolution count NE is between the predetermined low revolution count NEL and the predetermined high revolution count NEH (NEL<NE<NEH), the first correction coefficient KCMDLS is calculated by interpolation, in accordance with the engine revolution count NE.

Then, the second correction coefficient KCMDR is set to 1.0 (step S15), and program control thereafter advances to step S21.

At step S21, the target air-fuel ratio coefficient KCMD obtained at step S11 is corrected by multiplying the first correction coefficient KCMDLS by the second correction coefficient KCMDR. The processing is thereafter terminated.

As is described above, in this embodiment, the O2 sensor output VO2 is employed to determine whether the hydrogen density is increased downstream of the under floor three-way catalyst 17. When VO2>VO2H2 is established and it is ascertained that the hydrogen density is high, the target air-fuel ratio coefficient KCMD is corrected to lean by using the correction coefficient KCMDLS that is set in accordance with the O2 sensor output VO2. Therefore, the low emission characteristic, according to which the final unburnt element density is reduced to several tens of ppm or lower, can be constantly maintained. Further, when VO2≦VO2H2 is established and the engine 1 is in the low-load operating state, the second correction coefficient KCMDR is set to a predetermined rich value KCMDR0 that is slightly greater than 1.0. Thus, the occurrence of a phenomenon wherein the oxygen storage capacity of the three-way catalyst is saturated and the downstream side of the exhaust pipe enters an excessive oxygen state can be avoided. As a result, an increase in the amount of NOx in the exhaust can be prevented, and a preferable exhaust characteristic can be maintained.

In the processing in FIG. 2, only in the low-load operating state is the second correction coefficient KCMDR set to the predetermined rich value KCMDR0. This is because the oxygen storage capacity of the three-way catalyst frequently becomes saturated during a constant-speed operation, moderate acceleration or a deceleration operation with low-load revolutions.

Figure 5:
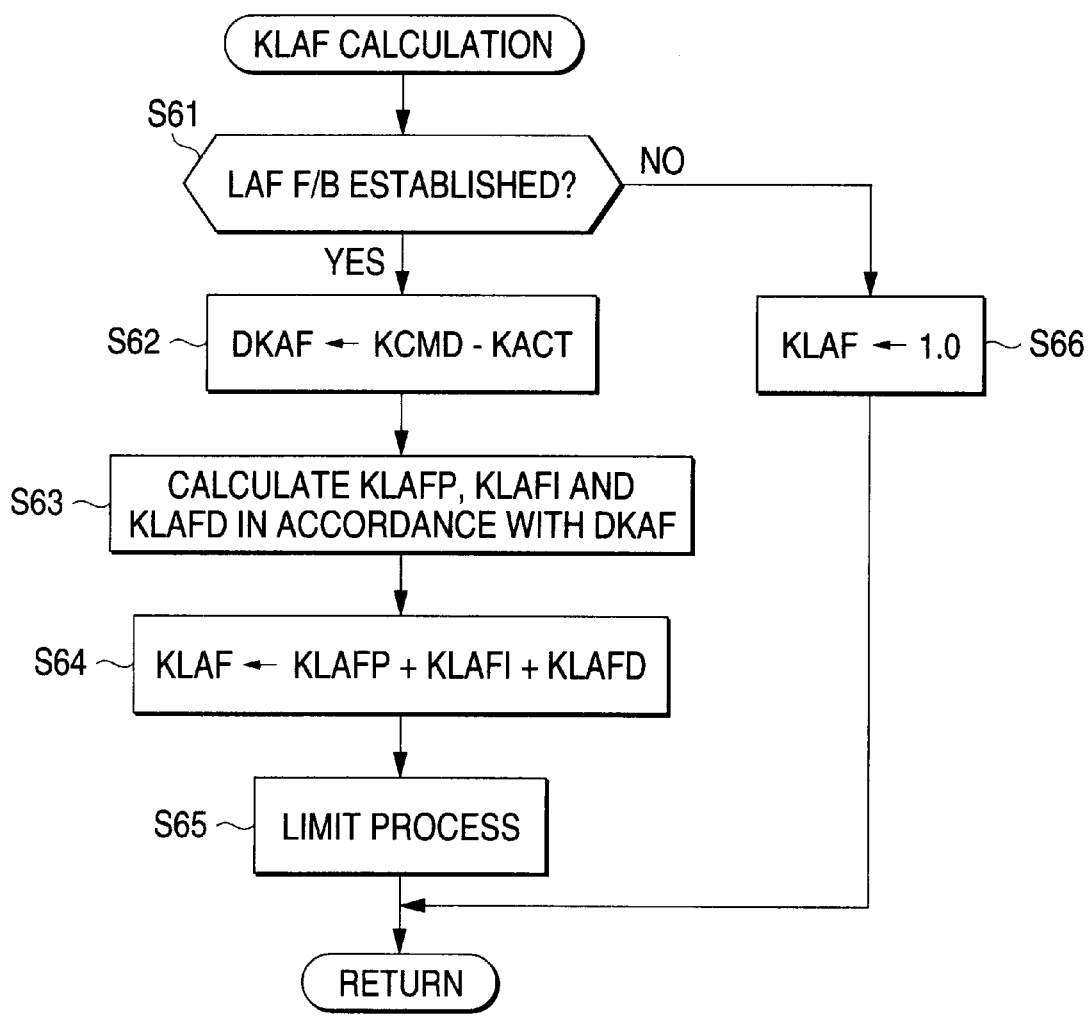
FIG. 5 is a flowchart showing the processing performed to calculate an air-fuel ratio correction coefficient (KLAF)

FIG. 5 is a flowchart showing the processing for calculating the air-fuel ratio correction coefficient KLAF, processing that is performed by the CPU 5b for each TDC signal pulse.

At step S61, a check is performed to determine whether the LAF feedback control condition has been established so as to execute feedback control in accordance with the output of the LAF sensor 18. The LAF feedback control condition is established when the LAF sensor 18 is activated and a fuel cut operation or a full throttle operation is not performed. When the decision at step S61 is No, that is, when LAF feedback control condition has been not established, the air-fuel ratio correction coefficient KLAF is set to 1.0 (step S66), and the processing is thereafter terminated.

When the LAF feedback control condition has been established, a deviation DKAF(k) (=KCMD(k)−KACT(k)) between the target air-fuel ratio coefficient KCMD and the detected equivalence ratio KACT, which is obtained by recalculation of the output of the LAF sensor 18, is calculated (step S62). The deviation DKAF(k) and control gains KP, KI and KD are employed for the equations below to obtain a proportional term KLAFP(k), an integral term KLAFI(k) and a differential term KLAFD(k) (step S63). (k) and (k−1) represent a current value and a preceding value.

KLAFP(k)=DKAF(k)×KP

KLAFI(k)=DKAF(k)×KI+KLAF(k−1)

KLAFD(k)=(DKAF(k)−DKAF(k−1))×KD

The proportional term KLAFP, the integral term KLAFI and the differential term KLAFD are added together to obtain the air-fuel ratio correction coefficient KLAF (=KLAFP+KLAFI+KLAFD) (step S64), and a limiting process is performed so that the value of the air-fuel ratio correction coefficient KLAF falls within the range bounded by the predetermined upper and lower limits (step S65). The processing is thereafter terminated.

Through this processing, feedback control is carried out, so that the detected equivalence ratio KACT, which is based on the LAF sensor output, matches the target air-fuel coefficient KCMD.

Figure 6:
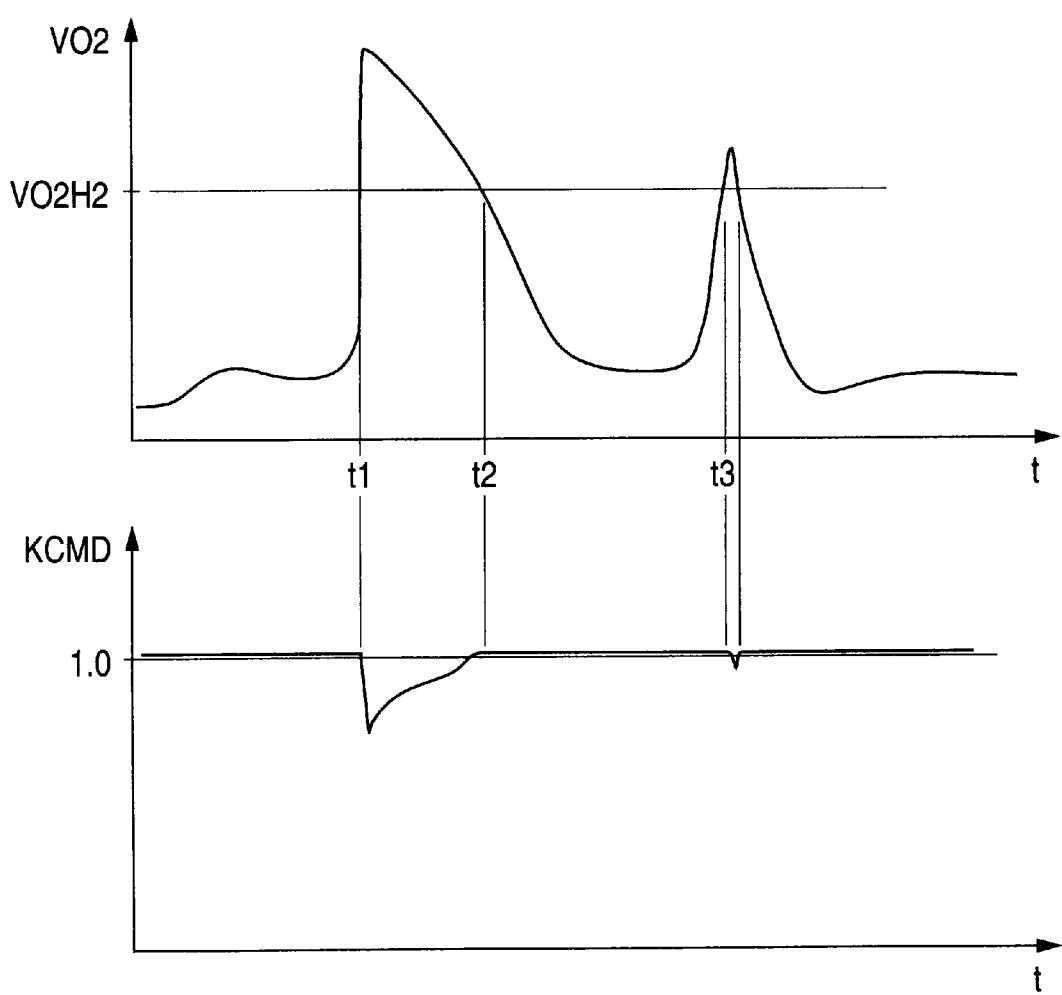
FIG. 6 is a time chart showing the changes in the O2 sensor output and the target air-fuel ratio coefficient (KCMD) when the processing in FIG. 2 is performed.

FIG. 6 is a time chart for the changes, in accordance with the embodiment, in the O2 sensor output and target air-fuel ratio coefficient (KCMD) when the processing in FIG. 2 is performed. Since VO2>VO2H2 is established during a period extending from time t1 to time t2, the target air fuel ratio coefficient KCMD is adjusted to lean side in accordance with the sensor output VO2. Since VO2<VO2H2 is established during a period from time t2 to time t3, the target air fuel ratio coefficient KCMD is set to a value slightly greater than 1.0.

In this embodiment, the close coupled three-way catalyst 14 and the first to third under floor catalysts 15 to 17 correspond to the catalyst means; step S11 in FIG. 2 corresponds to the target air-fuel ratio setting means; the process in FIG. 6 corresponds to the feedback control means; steps S12 to S14 and S20 in FIG. 2 correspond to the first target air-fuel ratio correction means; and steps S12, S15 and S16 to S19 in FIG. 2 correspond to the second target air-fuel ratio correction means. More specifically, the predetermined voltage VO2H2 corresponds to a "predetermined value" in claim 1; the correction using the first correction coefficient KCMDLS corresponds to the correction by the first target air-fuel ratio correction means; and the correction using the second correction coefficient KCMDR corresponds to the correction by the second target air-fuel ratio correction means.

The present invention is not limited to this embodiment, and can be variously modified. For example, the under floor three-way catalysts 15 and 16 may be combined to form a single catalyst, and the under floor three-way catalyst 17 may be an HC absorption catalyst that absorbs HC.

In addition, whereas in the embodiment the second correction coefficient KCMDR of the air-fuel ratio correction coefficient KCMD is set to the predetermined rich value KCMDR0 only when VO2≦VO2H2 is established and the engine 1 is in a low-load, low-running state, when VO2≦VO2H2 is established, the second correction coefficient KCMDR can always be set to the predetermined rich value KCMDR0. That is, the second target air-fuel ratio correction means in step 16 to 19 of FIG. 2, can be omitted as the occasion demands.

Furthermore, when the engine 1 is in a low-load, low-running state (NE≦NETH and PBA≦PBTH), the second correction coefficient KCMDR=KCMDR0 can always be established. And when VO2>VO2H2 is established, the first correction coefficient KCMDLS may be set to a smaller value (=MCMDLS/KCMDR0) relative to the predetermined rich value KCMDR0.

As is described above, according to the present invention, feedback control is carried out by using the output of the upstream side detection means to adjust the air-fuel ratio of the gas mixture so that it matches the target air-fuel ratio. And when the output of the downstream side detection means exceeds the predetermined value, the output of the target air-fuel ratio is corrected in accordance with the output of the downstream side detection means, and further, at least until the output of the downstream side detection means exceeds the predetermined value, the target air-fuel ratio is corrected to obtain a smaller value than the stoichiometric air-fuel ratio. When the output of the downstream side detection means exceeds the predetermined value, it means that the hydrogen density downstream of the downstream end catalyst means is high due to the water-gas reaction of the catalyst means. Therefore, only in this case, the target air-fuel ratio is corrected in accordance with the output of the downstream side detection means. As a result, correction of the target air-fuel ratio can be performed in accordance with a slight increase in the unburnt elements, and the density of the unburnt elements in the final exhaust can always be held low. In addition, at least until the output of the downstream side detection means exceeds the predetermined value, the target air-fuel ratio is set to a smaller value than the stoichiometric air-fuel ratio, so that a phenomenon can be prevented whereby there is an excessive increase in the oxygen contained in the exhaust and the NOx in the exhaust is increased. As a result, a preferable exhaust characteristic can be maintained.

What is claimed is:

1. An exhaust gas purifying apparatus for an internal combustion engine having an exhaust system, comprising:
   a plurality of catalysts;
   a first detection unit, disposed in the upstream of said catalysts, which detects the concentration of a predetermined substance;
   a second detection unit, disposed in the downstream of said catalysts, which detects the concentration of a predetermined substance;
   a target air-fuel ratio setting unit, sets a target air-fuel ratio of a mixture to be supplied to the engine;
   a feedback control unit which controls an air-fuel ratio of an air-fuel mixture to be supplied to said engine to said target air-fuel ratio in a feedback manner responsive to the output of said first detection unit; and
   a first target air-fuel ratio correction unit which corrects said target air-fuel ratio responsive to the output of the second detection unit only when the output of the second detection unit exceeds a predetermined value and when the output of the second detection unit is less than the predetermined value, the target air-fuel ratio set by said target air-fuel ratio setting means is used in the feedback control.

2. The exhaust gas purifying apparatus according to claim 1, comprising a second target air-fuel ratio correction unit which corrects said target air-fuel ratio to a smaller value than a stoichiometric air-fuel ratio at least until the output of said second detection unit exceeds said predetermined value.

3. The exhaust gas purifying apparatus according to claim 1, wherein said second detection unit is oxygen concentration detecting unit.

4. The exhaust gas purifying apparatus according to claim 1, wherein said first target air-fuel correction unit corrects said target air-fuel ratio to larger value than a stoichiometric air-fuel ratio, when the output of said second detecting unit exceeds a predetermined value.

* * * * *